United States Patent
Fox

(10) Patent No.: US 7,928,894 B1
(45) Date of Patent: Apr. 19, 2011

(54) PHASED ARRAY RADAR WITH MUTUALLY ORTHOGONAL CODING OF TRANSMITTED AND RECEIVED V AND H COMPONENTS

(75) Inventor: Peter W. Fox, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 165 days.

(21) Appl. No.: 12/435,802

(22) Filed: May 5, 2009

(51) Int. Cl.
*G01S 13/95* (2006.01)
(52) U.S. Cl. ............... 342/26 R; 342/26 D; 342/179; 342/188
(58) Field of Classification Search ............ 342/26 R, 342/26 A–26 D, 179, 188
See application file for complete search history.

(56) References Cited

U.S. PATENT DOCUMENTS

| | | | | |
|---|---|---|---|---|
| 3,359,555 | A * | 12/1967 | Taylor | 342/103 |
| 4,329,687 | A * | 5/1982 | Kloevekorn et al. | 342/136 |
| H484 | H * | 6/1988 | Holliday | 342/201 |
| 5,440,311 | A | 8/1995 | Gallagher et al. | |
| 5,815,121 | A | 9/1998 | Collier | |
| 6,437,737 | B1 * | 8/2002 | Azzarelli et al. | 342/360 |
| 6,859,163 | B2 * | 2/2005 | Alford et al. | 342/26 D |
| 2007/0222660 | A1 * | 9/2007 | Stagliano et al. | 342/26 R |
| 2009/0009391 | A1 * | 1/2009 | Fox et al. | 342/372 |
| 2009/0315762 | A1 * | 12/2009 | Venkatachalam et al. | 342/26 R |

OTHER PUBLICATIONS

Doviak, R. J. and Zrinc, D. S., "WSR-88D Radar for Research and Enhancement of Operations: Polarimetric Upgrades to Improve Rainfall Measurements", NOAA/NSSL, Apr. 1998.
Weber, M. E., et al, "The Next-Generation Multimission U.S. Surveillance Radar Network", Bull Amer. Meteor, Soc. vol. 88, No. 11, pp. 1739-1751, Nov. 2007.
Dinan, E. H., Jabbari, B. "Spreading Codes for Direct Sequence CDMA and Wideband CDMA Cellular Networks" Communications Magazine, IEEE, vol. 36, Issue 9, Sep. 1998 pp. 48-54.

* cited by examiner

*Primary Examiner* — John B Sotomayor
(74) *Attorney, Agent, or Firm* — Duane Morris LLP

(57) ABSTRACT

A polarimetric radar with V and H polarized array antenna elements which transmit a V component modulated by a V code and the H component modulated by an H code orthogonal thereto. Unwanted polarization errors occur at off-boresight angles, which tend to obscure the polarization characteristics of the target. Radar returns are processed to form four independent channels by convolving the signals received by the V and H antennas with the mutually orthogonal V and H codes. This overcomes the polarization obscuration and allows determination of the polarimetric ratio of the target with high accuracy.

4 Claims, 2 Drawing Sheets

US 7,928,894 B1

PHASED ARRAY RADAR WITH MUTUALLY ORTHOGONAL CODING OF TRANSMITTED AND RECEIVED V AND H COMPONENTS

BACKGROUND OF THE INVENTION

Those skilled in the arts of antennas and arrays know that antennas are transducers which transduce electromagnetic energy between unguided- and guided-wave forms. More particularly, the unguided form of electromagnetic energy is that propagating in "free space," while guided electromagnetic energy follows a defined path established by a "transmission line" of some sort. Transmission lines include coaxial cables, rectangular and circular conductive waveguides, dielectric paths, and the like. Antennas are totally reciprocal devices, which have the same beam characteristics in both transmission and reception modes. For historic reasons, the guided-wave port of an antenna is termed a "feed" port, regardless of whether the antenna operates in transmission or reception. The beam characteristics of an antenna are established, in part, by the size of the radiating portions of the antenna relative to the wavelength. Small antennas make for broad or nondirective beams, and large antennas make for small, narrow or directive beams.

When more directivity (narrower beamwidth) is desired than can be achieved from a single antenna, several antennas may be grouped together into an "array" and fed together in a phase-controlled manner, to generate the beam characteristics of an antenna larger than that of any single antenna element. The structures which control the apportionment of power to (or from) the antenna elements are termed "beamformers," and a beamformer includes a beam port and a plurality of element ports. In a transmit mode, the signal to be transmitted is applied to the beam port and is distributed by the beamformer to the various element ports. In the receive mode, the unguided electromagnetic signals received by the antenna elements and coupled in guided form to the element ports are combined to produce a beam signal at the beam port of the beamformer. A salient advantage of sophisticated beamformers is that they may include a plurality of beam ports, each of which distributes the electromagnetic energy in such a fashion that different antenna beams may be generated simultaneously. The advantages of antenna arrays over single-antenna transducers has led to extensive use of array antennas. A notable disadvantage of antenna arrays is that, when the antenna beam is scanned away from broadside to the array, the polarization response of the elemental antennas (elements) of the array is degraded, and the larger the scan angle, the greater the degradation, because the element-level phase progression that steers the beam results in tilting of the beam relative to each element. Reflector-type antennas, however, are mechanically steered to point the beam, and provide high cross-polarization purity. The degraded off-axis cross-polarization performance of antenna arrays has inhibited the use of such arrays for polarimetric weather measurements and research.

Improved radar using array antennas for polarimetric measurements is desired.

SUMMARY OF THE INVENTION

A radar system according to an aspect of the invention is for illuminating a target. The radar system comprises a first array of antenna elements. The first array of antenna elements includes at least one guided-field input-output port. The first array of antenna elements is for transducing electromagnetic fields of a first polarization. The radar system also comprises a second array of antenna elements. The second array of antenna elements includes at least one guided-wave input-output port. The second array of antenna elements is for transducing electromagnetic fields of a second polarization which is orthogonal to the first polarization. The radar includes a source of radio-frequency energy at a frequency related to a radar transmit frequency. A source is provided of first and second mutually orthogonal coding waveforms. A convolver is coupled to the source of radio-frequency energy and to the source of mutually orthogonal coding waveforms, for convolving the radio-frequency energy with the first and second mutually orthogonal coding waveforms, to thereby generate first and second modulated radio-frequency energy with first and second mutually orthogonal modulations, respectively. A first transmit-receive arrangement is coupled to the input-output port of the first array of antenna elements and to the convolver, for, in a transmit operating mode, applying the first modulated radio-frequency energy to the input-output port of the first array of antenna elements for transduction into unguided waves of the first polarization, and for, in a receive operating mode, receiving guided waves transduced by the first array of antenna elements. A second transmit-receive arrangement is coupled to the input-output port of the second array of antenna elements and to the convolver, for, in a transmit operating mode, applying the second modulated radio-frequency energy to the input-output port of the second array of antenna elements for transduction into unguided waves of the second polarization, and for, in a receive operating mode, receiving guided waves transduced by the second array of antenna elements. A deconvolver comprises first and second delay elements coupled to the source of first and second mutually orthogonal coding waveforms for delaying the first and second mutually orthogonal coding waveforms, respectively, by a selected amount, to thereby generate first and second delayed mutually orthogonal signals, the deconvolver also including first, second, third, and fourth multipliers, each of the first and second multipliers being coupled to receive the first delayed mutually orthogonal signals, and each of the third and fourth multipliers being coupled to receive the second delayed mutually orthogonal signals, the first and third multipliers also being coupled to the first transmit-receive arrangement for, in the receive mode of operation, receiving guided electromagnetic signals originating from the first array of antenna elements, for thereby generating first and third components of received signals, the second and fourth multipliers being coupled to the second transmit-receive arrangement, for, in the receive mode of operation, receiving guided electromagnetic signals originating from the second array of antenna elements, for thereby generating second and fourth components of received signals. A processor is coupled to receive the first, second, third, and fourth components of received signals, for determining the polarimetric ratio or differential reflectivity of the illuminated target.

A particular embodiment of this aspect of the invention further comprises a display for displaying a plan-position representation of the return signals representing each of the first and second polarizations.

DESCRIPTION OF THE INVENTION

Figure 1A:
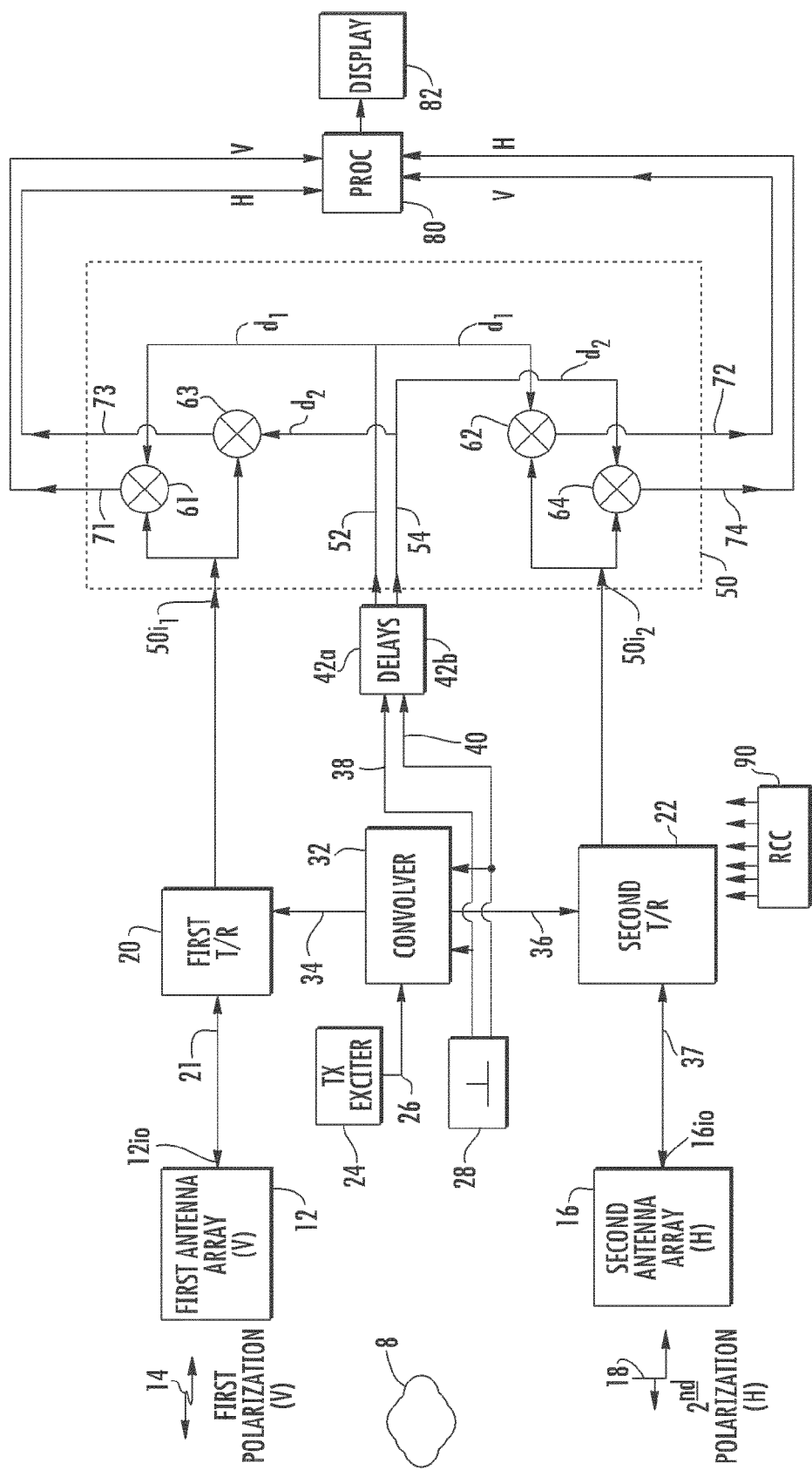
FIG. 1A is a simplified diagram in block and schematic form of a radar system according to an aspect of the invention.

FIG. 1A is a simplified representation of a radar system 10 of the polarimetric type, in which the target 8 is typically a weather phenomenon such as a cloud or source of precipitation. Radar system 10 of FIG. 1A includes an exciter illustrated as a block 24, which is controlled to produce pulses of guided electromagnetic energy (as opposed to unguided energy as would occur in free space) on a path 26. Guided electromagnetic energy follows a defined path established by a "transmission line" of some sort. A salient difference between a "transmission line" and an ordinary electrical conductor arrangement is that the transmission line has constant surge or characteristic impedance along its length, or if the impedance varies along its length the variation is controlled rather than uncontrolled. Transmission lines include coaxial cables, rectangular and circular conductive waveguides, dielectric paths, and the like. Each of these structures has the property that transverse dimensions and cross-sectional topology remain constant (or change in a controlled manner) as a function of length. Thus, the diameter of the center conductor and bore of the outer conductor of a coaxial transmission line remain constant along the pertinent length. Topological transformations of the cross-section of a transmission line can result in a different type of transmission line, as for example a topological transformation of a coaxial transmission line can result in a microstrip transmission line configuration.

The frequency and pulse characteristics of the exciter 24 of FIG. 1A are controlled by a radar control computer (RCC), illustrated as a block 90, so that inter alia the "radio frequency" of the electromagnetic signals is related to the radar transmission frequency. In the past, the term "radio frequencies" was interpreted to mean a limited range of frequencies, such as, for example, the range extending from about 20 KHz to 2 MHz. Those skilled in the art know that "radio" frequencies as now understood extends over the entire frequency spectrum, including those frequencies in the "microwave" and "millimeter-wave" regions, and up to light-wave frequencies. Many of these frequencies are very important for commercial purposes, as they include the frequencies at which radar systems, global positioning systems, satellite cellular communications and ordinary terrestrial cellphone systems operate. The exciter signal is applied to a convolver illustrated as a block 32.

RCC 90 of FIG. 1A also controls other parameters and aspects of radar 10, as known in the art. Radar 10 also includes a source 28 of sequences of mutually orthogonal (⊥) or mutually complementary binary signals. The salient properties of the mutually orthogonal signals or codes are that when combined, they do not add, and when the combined signal is deconvolved with one of the codes, only the data contained in that channel is extracted. Thus, each of the mutually orthogonal codes produces an independent data channel on a common radio frequency (RF) carrier which has good isolation from the other data channels based on the degree of orthogonality of codes themselves. Mutually orthogonal or complementary digital or binary signals are well known in the art, as for example in U.S. Pat. No. 5,440,311 issued Aug. 8, 1995 in the name of Gallagher et al., and require no further description. The two sequences of mutually orthogonal binary signals produced by block 28 of FIG. 1A are separately applied by way of paths 38 and 40 to convolver 32 and to a delay function illustrated as a pair of blocks 42a and 42b. Convolver block 32 separately convolves the exciter signal from block 24 with each of the two mutually orthogonal signals from block 28. Thus, the radio-frequency signal from exciter 24 is convolved within convolver 32 with the binary sequence appearing on path 38, to produce what amounts to modulated signal, which is applied over a path 34 to a first transmit/receive (TR) device 20. Similarly, the radio-frequency (RF) signal from exciter 24 is convolved within convolver 32 with the binary sequence appearing on path 40, to produce what amounts to modulated signal which is applied over a path 36 to a second transmit/receive (TR) device 22. Transmit-receive blocks 20 and 22 route the modulated RF signals by way of paths 21 and 37, respectively, to input/output (IO) ports 12io and 16io, respectively, of first and second antenna arrays 12 and 16, respectively. First antenna array 12 is polarized or oriented to transduce "vertical" (V) polarized unguided radiation illustrated by a "lightning bolt" symbol 14, and second array 16 is polarized or oriented to transducer "horizontal" (H) unguided radiation illustrated by a "lightning bolt" symbol 18.

Figure 1B:
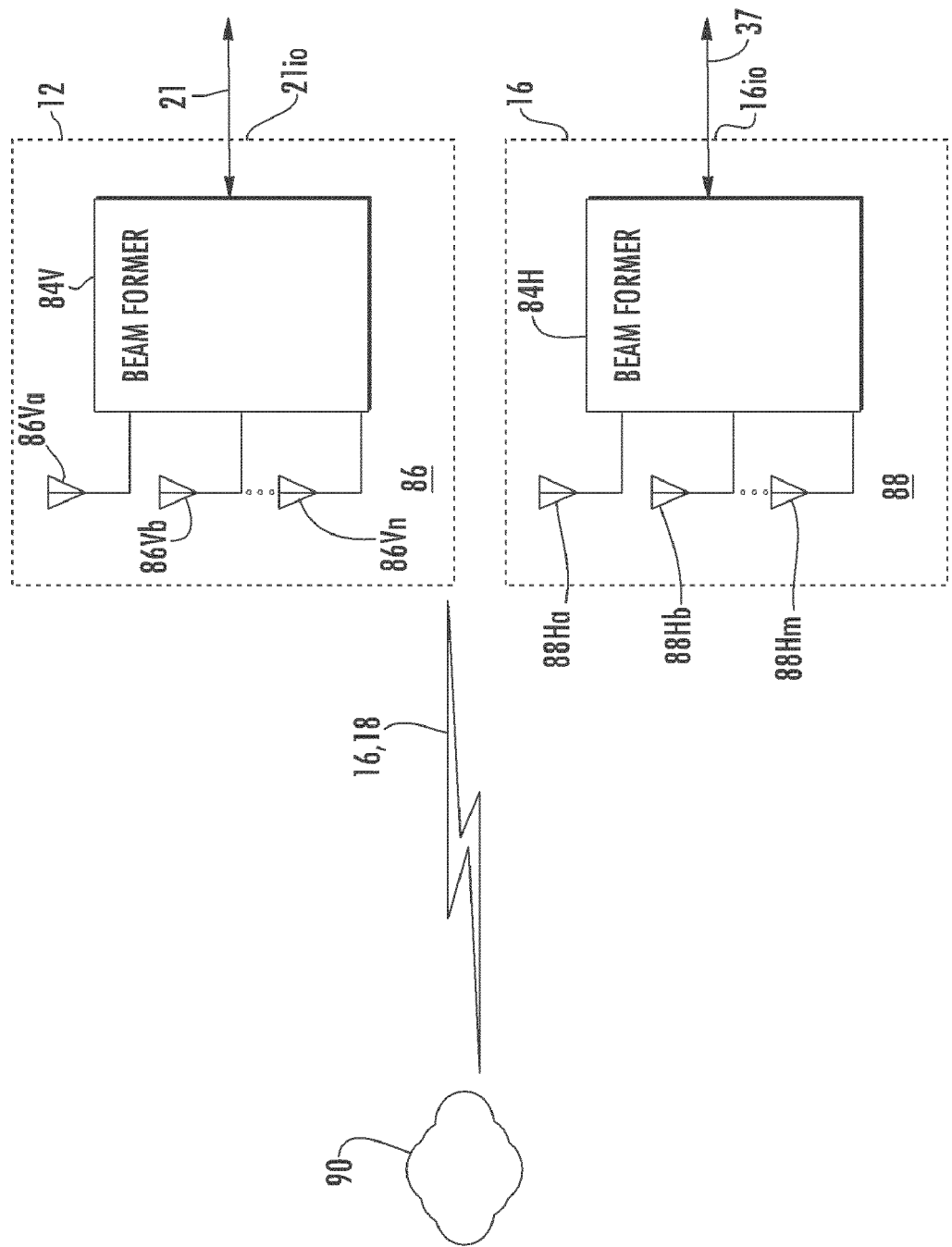
FIG. 1B illustrates some details of antenna arrays of FIG. 1A.

FIG. 1B illustrates some details of the array antennas 12 and 16 of FIG. 1A. In FIG. 1B, elements corresponding to those of FIG. 1A are designated by the same reference alphanumerics. As illustrated in FIG. 1B, array antenna arrangement 12 includes a beamformer illustrated as a block 84V, connected to common or beam port 12io and to the array 86 of elemental antennas. Array 86 as illustrated includes antenna elements 86Va, 86Vb, . . . , 86Vn. Similarly, array antenna arrangement 16 includes a beamformer illustrated as a block 84H, connected to common or beam port 16io and to the array 88 of elemental antennas. Array 88 as illustrated includes antenna elements 88Ha, 88Hb, . . . , 88Hm. When excitation energy is applied to port 12io, the energy is distributed by beamformer 84V among the elemental antennas of set 86, to thereby form the desired vertically polarized beam or beams. Similarly, when excitation energy is applied to port 16io, the energy is distributed by beamformer 84H among the elemental antennas of set 88, to thereby form the desired horizontally polarized beam or beams. The direction in which the beam or beams are formed depends upon relative phase and possibly amplitude control of the excitation applied to the various antenna elements of the vertically and horizontally polarized portions, as is known in the art. The phase and amplitude control is established by the radar control computer (RCC) 90 of FIG. 1A.

As mentioned, when the antenna beams are steered away from broadside to the plane of the antenna array, the polarization purity is compromised. More particularly, at large angles away from a broadside condition, changes in the apparent aspect ratio of the antenna element(s) to the ground as seen from the direction of the impinging wave and increases in feed-point effects on the radiation pattern result in changes in the cross-polarization of all antennas. These changes in cross-polarization may be unacceptable in the context of radar polarimetric measurements. Thus, the unguided radiation arriving at a target such as cloud 90 of FIG. 1B does not exhibit pure vertical or pure horizontal polarization. Instead, the target receives an intermixture of vertically and horizontally polarized radiation components depending upon the aspect angle of the array as seen from the target. Reflected energy from the cloud 90 thus contains an intermixture of vertically polarized and horizontally polarized components. Some of the reflected RF components are reflected back toward the antenna arrays 12 and 16 (the radar "return"), and are received and transduced into guided waves by the antenna arrays 12 and 16. The guided "return" signals or waves received by first antenna array 12 in a reception mode are coupled by way of path 21 to TR 20, which passes the received signals on to an input port 50i1 of a deconvolver 50. The guided waves received by second antenna array 16 in the reception mode are coupled by way of path 37 to TR 22, which passes the received signals on to an input port 50i2 of deconvolver 50.

It will be understood that, because of the off-axis or off-boresight polarization purity problems of an array antenna, the transmitted V and H signals will arrive at the target as a mixture of V and H components. Consequently, the reflection from the target (the return signal) starts out as a mixture of V and H components, and this mixture is further mixed by the off-boresight response of the array antennas. Even if the radar signals reflected by the target were pure vertical andor horizontal, the polarization properties of the array antennas 12 and 16 would result in cross-contamination of the polarization components. According to an aspect of the invention, the mutually orthogonal modulation of the V and H beams allows identification of the desired and undesired components of the signal received from the target, and allows them to be separated.

Deconvolver 50 of FIG. 1A also receives from block 28 the sequences of mutually orthogonal or coding signals, delayed by an amount equal to the time required for electromagnetic radiation to make the trip from the radar to the target and for the reflected energy to return to the radar. This round-trip time is well known to correspond to 12.4 microseconds per nautical mile of range. The delay is imposed on the mutually orthogonal signal sequences by delay blocks 42a and 42b, under the control of the radar control computer 90. Thus, deconvolver 50 of FIG. 1A receives at paths 52 and 54 the mutually orthogonal binary sequences with delays appropriate to the round-trip time between the radar 10 and the target 8. The delayed sequence on path 52 is designated d1, and the delayed sequence on path 54 is designated d2.

Deconvolver 50 of FIG. 1A also includes a first multiplier (X) 61, a second multiplier 62, a third multiplier 63, and a fourth multiplier 64. Multipliers 61 and 63 are connected by way of port 50i1 and first TR 20 to receive the return or reflected signal transduced by the first antenna array 12, and multipliers 62 and 64 are connected by way of a port 50i2 and second TR 22 to receive the return or reflected signal transduced by the second antenna array 16.

The return signal transduced by antenna array 12 and applied by way of port 50i1 to multiplier 61 is modulated or multiplied by delayed sequence d1, and the return signal transduced by antenna array 12 and applied by way of port 50i1 to multiplier 63 is modulated or multiplied by delayed sequence d2. Similarly, the return signal transduced by antenna array 16 and applied by way of port 50i2 to multiplier 62 is modulated or multiplied by delayed sequence d1, and the return signal transduced by antenna array 16 and applied by way of port 50i2 to multiplier 64 is modulated or multiplied by delayed sequence d2. The delay which is imposed depends upon the range of the target, and is readily determined by those skilled in the art. The multiplication of the return signals received by nominally V antenna 12 by the first orthogonal sequence d1 in multiplier 61 will enhance any return which originated from a vertically polarized transmitted signal, and will attenuate or disregard any return originating from a horizontally-polarized transmission. Thus, the deconvolved product produced by multiplier 61 on signal path 71 will tend to represent pure vertical return signal, without contributions by the horizontal signal components. Similarly, The multiplication of the return signals received by nominally V antenna 12 by the second orthogonal sequence d2 in multiplier 63 will enhance any return which originated from a horizontally polarized transmitted signal, and will attenuate or disregard any return originating from a vertically-polarized transmission. Thus, the deconvolved product produced by multiplier 63 on signal path 73 will tend to represent pure horizontal return signal, without contributions by the vertical signal components.

The multiplication of the return signals received by nominally H antenna 16 by the first orthogonal sequence d1 in multiplier 62 of FIG. 1A will enhance any return which originated from a vertically polarized transmitted signal, and will attenuate or disregard any return originating from a horizontally-polarized transmission. Thus, the deconvolved product produced by multiplier 62 on signal path 72 will tend to represent pure vertical return signal, without contributions by the horizontal signal components. Similarly, the multiplication of the return signals received by nominally H antenna 16 by the second orthogonal sequence d2 in multiplier 64 will enhance any return which originated from a horizontally polarized transmitted signal, and will attenuate or disregard any return originating from a vertically-polarized transmission. Thus, the deconvolved product produced by multiplier 62 on signal path 72 will tend to represent pure horizontal return signal, without contributions by the vertical signal components.

Thus, the deconvolved or multiplied signals on path 71 of FIG. 1A represent the response of the vertically polarized antenna 12 to the "vertical return", the signals on path 72 represent the response of the horizontally polarized antenna 16 to the "vertical return, the signals on path 73 represent the response of the vertically polarized antenna 16 to the "horizontal return," and the signals on path 74 represent the response of the horizontal antenna 16 to the "horizontal return." Taken together, the signal components produced by deconvolver 50 on paths 71 and 72 represent the entirety of the vertically polarized response, and, taken together, the signal components produced by deconvolver 50 on paths 73 and 74 represent the entirety of the horizontally polarized response.

Since all of the vertically and horizontally polarized components are individually identified and separated onto paths 71, 72, 73, and 74 of FIG. 1A, a determination of the V and H responses can be made by simply processing the returns. The processing of the return signals on paths 71, 72, 73, and 74 is performed in a processor designated 80.

The processing in block 80 can be understood by the following.

Let IV be the transmit input voltage of the vertically polarized portion or element of the antenna, namely portion 12 of FIG. 1A. The magnitude of IV is unknown.

Let IH be the transmit input voltage of the Horizontally polarized antenna portion 16. The relationship between the vertical and horizontal element input or transmit voltages is established by calibration Such calibration is well known in the art and can be interleaved in time with the radar pulses or by periodic measurement of the output unguided wave to an external antenna/receiver. Therefore, IH=cal×IV, where cal is the calibration value.

Let X be the ratio $V_{pol}/H_{pol}$=Zdr of the target, which is to be measured by the radar.

Let Y represent the unknown cross-polarization component transmitted or received by the vertically polarized portion 12 of the antenna of FIG. 1A.

Let Z represent the unknown cross-polarization component transmitted or received by the horizontally polarized portion 16 of the antenna of FIG. 1A.

The convolution of the signal received by the vertically polarized element with the V orthogonal code is

IV*(1−Y)2*X+IV*(1−Y)2*(1−X)

where * represents multiplication.

The convolution of the signal received by the horizontally polarized element with the H orthogonal code is cal*IV*(1−Z)2*(1−X)+cal*IV*(Z)2*X The convolution of the signal received by the vertically polarized element with the H orthogonal code is $$cal*IV*(1-Z)*(1-X)*Y+cal*IV**(Z)*(1-Y)*X$$

The convolution of the signal received by the horizontally polarized element with the V orthogonal code is $$IV*(1-Y)*X*Z+IV*Y*(1-Z)*(1-X).$$

The four equations relating the four received and convolved inputs to the processor 80 of FIG. 1 are solved simultaneously for the polarization ratio (Zdr) of the target. The polarization ratio is represented by X in each equation. A system of four equations with four unknowns can be uniquely solved as known in the art.

When the vertical and horizontal components of the reflection from the target 8 are known, the information can be displayed in the form of image density or image color (or both) on a plan-position-indicator (PPI) display, as is well known in the radar and weather arts, to give a "map-like" display of precipitation characteristics in the radar coverage area.

A radar system (10) according to an aspect of the invention is for illuminating a target (90). The radar system (10) comprises a first array (12) of antenna elements (86). The first array of antenna elements (12) includes at least one guided-field input-output port (12*io*). The first array (12) of antenna elements is for transducing electromagnetic fields (14) of a first polarization (V). The radar system (10) also comprises a second array (16) of antenna elements (88). The second array of antenna elements (16) includes at least one guided-wave input-output port (16*io*). The second array (16) of antenna elements (88) is for transducing electromagnetic fields (18) of a second polarization (H) which is orthogonal to the first polarization (V). The radar (10) includes a source (24) of radio-frequency energy at a frequency related to a radar (10) transmit frequency. A source (28) is provided of first and second mutually orthogonal coding waveforms. A convolver (32) is coupled to the source of radio-frequency energy (24) and to the source (28) of mutually orthogonal coding waveforms, for convolving the radio-frequency energy with the first and second mutually orthogonal coding waveforms, to thereby generate first (on path 34) and second (on path 36) modulated radio-frequency energy with first and second mutually orthogonal modulations, respectively. A first transmit-receive arrangement (20) is coupled (21) to the input-output port (12*io*) of the first array (12) of antenna elements (86) and (by way of 34) to the convolver (32), for, in a transmit operating mode, applying the first modulated radio-frequency energy to the input-output port (12*io*) of the first array (12) of antenna elements (86) for transduction into unguided waves (14) of the first polarization (V), and for, in a receive operating mode, receiving guided waves transduced (onto path 21) by the first array (12) of antenna elements (86). A second transmit-receive arrangement (22) is coupled (37) to the input-output port (16*io*) of the second array (16) of antenna elements (88) and to the convolver (32), for, in a transmit operating mode, applying the second modulated radio-frequency energy to the input-output port (16*io*) of the second array (16) of antenna elements (88) for transduction into unguided waves (18) of the second polarization (H), and for, in a receive operating mode, receiving guided waves transduced (onto path 37) by the second array (16) of antenna elements (88). A deconvolver (50) comprises first (42*a*) and second (42*b*) delay elements coupled to the source of first and second mutually orthogonal coding waveforms (28) for delaying the first and second mutually orthogonal coding waveforms, respectively, by a selected amount, to thereby generate first (d1) and second (d2) delayed mutually orthogonal signals, the deconvolver also including first (61), second (62), third (63), and fourth (64) multipliers, each of the first (61) and second (62) multipliers being coupled to receive the first delayed mutually orthogonal signals (d1), and each of the third (63) and fourth (64) multipliers being coupled to receive the second delayed mutually orthogonal signals (d2), the first (61) and third (63) multipliers also being coupled to the first transmit-receive arrangement (20) for, in the receive mode of operation, receiving guided electromagnetic signals originating from the first array (16) of antenna elements (86), for thereby generating first (on path 71) and third (on path 73) components of received signals, the second (62) and fourth (64) multipliers being coupled to the second transmit-receive arrangement (22), for, in the receive mode of operation, receiving guided electromagnetic signals originating from the second array (16) of antenna elements (88), for thereby generating second (on path 72) and fourth (on path 74) components of received signals. A processor (80) is coupled to receive the first, second, third, and fourth components of received signals, for determining the polarimetric ratio or differential reflectivity of the illuminated target.

A particular embodiment of this aspect of the invention further comprises a display for displaying a plan-position representation of the return signals representing each of the first (V) and second (H) polarizations.

What is claimed is:
1. A radar system for illuminating a target, comprising:
a first array of antenna elements, said first array of antenna elements including at least one guided-field input-output port, said first array of antenna elements being for transducing electromagnetic fields of a first polarization;
a second array of antenna elements, said second array of antenna elements including at least one guided-wave input-output port, said second array of antenna elements being for transducing electromagnetic fields of a second polarization, orthogonal to said first polarization;
a source of radio-frequency energy at a frequency related to a radar transmit frequency;
a source of first and second mutually orthogonal coding waveforms;
a convolver coupled to said source of radio-frequency energy and to said source of mutually orthogonal coding waveforms, for convolving said radio-frequency energy with said first and second mutually orthogonal coding waveforms, to thereby generate first and second modulated radio-frequency energy with first and second mutually orthogonal modulations, respectively;
a first transmit-receive arrangement coupled to said input-output port of said first array of antenna elements and to said convolver, for, in a transmit operating mode, applying said first modulated radio-frequency energy to said input-output port of said first array of antenna elements for transduction into unguided waves of said first polarization, and for, in a receive operating mode, receiving guided waves transduced by said first array of antenna elements;
a second transmit-receive arrangement coupled to said input-output port of said second array of antenna elements and to said convolver, for, in a transmit operating mode, applying said second modulated radio-frequency energy to said input-output port of said second array of antenna elements for transduction into unguided waves of said second polarization, and for, in a receive operating mode, receiving guided waves transduced by said second array of antenna elements;

a deconvolver comprising first and second delay elements coupled to said source of first and second mutually orthogonal coding waveforms for delaying said first and second mutually orthogonal coding waveforms, respectively, by a selected amount, to thereby generate first and second delayed mutually orthogonal signals, said deconvolver also including first, second, third, and fourth multipliers, each of said first and second multipliers being coupled to receive said first delayed mutually orthogonal signals, and each of said third and fourth multipliers being coupled to receive said second delayed mutually orthogonal signals, said first and third multipliers also being coupled to said first transmit-receive arrangement for, in said receive mode of operation, receiving guided electromagnetic signals originating from said first array of antenna elements, for thereby generating first and third components of received signals, said second and fourth multipliers being coupled to said second transmit-receive arrangement, for, in said receive mode of operation, receiving guided electromagnetic signals originating from said second array of antenna elements, for thereby generating second and fourth components of received signals; and a processor coupled to receive said first, second, third, and fourth components of received signals, for determining the polarimetric ratio (differential reflectivity) of the illuminated target.

2. A radar system according to claim 1, further comprising a display for displaying a plan-position representation of the return signals representing each of said first and second polarizations.

3. A radar system according to claim 1, wherein said processor receives said first, second, third, and fourth components of received signals, and simultaneously solves a system of four equations with four unknowns to determine the polarimetric ratio (differential reflectivity) of the illuminated target.

4. A radar system for illuminating a target, comprising:
a first array of antenna elements;
a second array of antenna elements;
a source of radio-frequency energy;
a source of coding waveforms;
a convolver for convolving said radio-frequency energy with said coding waveforms, to thereby generate first and second modulated radio-frequency energy with first and second mutually orthogonal modulations, respectively;
a first transmit-receive arrangement associated with said first array of antenna elements and said convolver, for, in a transmit operating mode, applying said first modulated radio-frequency energy to said first array of antenna elements, and for, in a receive operating mode, receiving waves transduced by said first array of antenna elements;
a second transmit-receive arrangement associated with said second array of antenna elements and said convolver, for, in a transmit operating mode, applying said second modulated radio-frequency energy to said second array of antenna elements, and for, in a receive operating mode, receiving waves transduced by said second array of antenna elements;
a deconvolver comprising delay elements for delaying said coding waveforms by a selected amount, to thereby generate delayed signals, said deconvolver also including multipliers for receiving said delayed signals, some of said multipliers being coupled to said first transmit-receive arrangement for, in said receive mode of operation, receiving electromagnetic signals originating from said first array of antenna elements, thereby generating certain components of received signals, others of said multipliers being coupled to said second transmit-receive arrangement, for, in said receive mode of operation, receiving electromagnetic signals originating from said second array of antenna elements, thereby generating certain other components of received signals; and
a processor for receiving said components of said received signals, for determining the polarimetric ratio of the illuminated target.

* * * * *